US007891695B2

(12) United States Patent
Perk

(10) Patent No.: US 7,891,695 B2
(45) Date of Patent: Feb. 22, 2011

(54) UPRIGHT WHEELCHAIR

(75) Inventor: Heinrich Perk, Aglasterhausen (DE)

(73) Assignee: Otto Bock HealthCare GmbH, Duderstadt (DE)

(*) Notice: Subject to any disclaimer, the term of this patent is extended or adjusted under 35 U.S.C. 154(b) by 228 days.

(21) Appl. No.: 12/210,623

(22) Filed: Sep. 15, 2008

(65) Prior Publication Data

US 2009/0072513 A1 Mar. 19, 2009

(30) Foreign Application Priority Data

Sep. 18, 2007 (DE) ...................... 10 2007 044 832

(51) Int. Cl.
*B62B 3/02* (2006.01)

(52) U.S. Cl. ........................................ 280/647; 297/68

(58) Field of Classification Search ................. 280/639, 280/642, 643, 647, 648, 649, 650; 297/68, 297/71, 83, 90, 91, DIG. 10
See application file for complete search history.

(56) References Cited

U.S. PATENT DOCUMENTS

| | | | | |
|---|---|---|---|---|
| 3,640,566 | A * | 2/1972 | Hodge | 297/68 |
| 4,076,304 | A * | 2/1978 | Deucher | 297/45 |
| 4,231,614 | A * | 11/1980 | Shaffer | 297/330 |
| 4,538,857 | A * | 9/1985 | Engman | 297/423.38 |
| 5,356,172 | A | 10/1994 | Levy | |
| 6,601,869 | B2 * | 8/2003 | Porcheron | 280/648 |
| 6,976,698 | B2 * | 12/2005 | Kuiken | 280/647 |
| 7,419,176 | B2 * | 9/2008 | Perk | 280/250.1 |
| 2004/0227331 | A1 * | 11/2004 | Chen et al. | 280/650 |

FOREIGN PATENT DOCUMENTS

| | | |
|---|---|---|
| DE | 26 25 045 B1 | 6/1976 |
| DE | 102 37 878 A1 | 7/2004 |
| EP | 0 815 822 B1 | 6/1997 |
| FR | 2 697 418 | 5/1994 |
| WO | 0 155 918 | 9/1985 |

* cited by examiner

*Primary Examiner*—J. Allen Shriver, II
*Assistant Examiner*—John D Walters
(74) *Attorney, Agent, or Firm*—Whitham Curtis Christofferson & Cook, PC

(57) ABSTRACT

An upright wheelchair with a chassis (29, 22), a seat (2) arranged pivotably on the chassis (29, 22), which can be pivoted from a substantially horizontal seating position to a substantially vertical standing position during upright motion, and at least one footrest (16) arranged on the chassis (29, 22), which is lowered to the ground in the standing position, is characterised in that when the seat (2) is in the seating position the footrest (16) is inclined at an angle (α) relative to the horizontal (H) and the angle (α) returns to zero during upright motion.

16 Claims, 5 Drawing Sheets

1
2
3
8
9
10
11
12
14
16
17
18
19
22
23
24
25
26
27
169
α
β
γ
H

UPRIGHT WHEELCHAIR

FIELD OF THE INVENTION

The present invention relates to an upright wheelchair with a chassis, a seat arranged pivotably on the chassis, which can be pivoted from a substantially horizontal seating position to a substantially vertical standing position during upright motion and at least one foot support arranged on the chassis, which is lowered to the ground in the standing position.

BACKGROUND OF THE INVENTION

This type of upright wheelchair is known for example from EP 0 815 822 B1.

The seated posture of a wheelchair occupant maintained over a long period results in physical breakdown of bodily functions, such as for example reduced mobility of the lower limbs, a slowdown in bowel activity and impairment to blood circulation. Sitting also adds the risk of bedsores. An upright wheelchair aids in reducing these consequences, since the breakdown of bodily functions is reduced by changing posture, including standing. The pivoting seat area is mounted with back and footrest on a chassis. Correct adapting to the anatomical requirements of the user is a vital criterion for comfort offered by the wheelchair.

Upright wheelchairs also offer the user the option of taking part in sports, such as playing golf. In such a case it is particularly important that the wheelchair offers a high degree of standing stability in the upright position. It is a requirement for example for the footrest to stand on the ground or respectively to be supported thereon when the wheelchair is in the upright position. The seat back must be parallel to the seat area and the golfer must be given adequate opportunity for movement (turning of the upper body) to be able to swing properly.

When the seat is switched to the standing position the footrest is lowered in the direction of the ground. By altering the height of the foot support relative to the ground the distance between seat area and footrest is also changed at the same time. This is necessary, since the anatomical axis of rotation in the knee joint does not coincide with the axis of rotation of the seat area. For the wheelchair to be secure in the standing position the footrest plane must be lying on the ground, therefore aligned substantially perpendicularly to the chassis. A comfortable seating position is assumed by way of contrast whenever the foot assembly (or respectively the foot stand area) is inclined in relation to the horizontal, therefore does not run parallel to the ground. Since standing security has a higher priority than seating comfort in the case of the known wheelchair the footrest also is not inclined in the seating position, rather it runs parallel to the ground. The patient consequently assumes an anatomically inappropriate seating posture; with a greater knee angle the patient sustains deformity of the foot.

SUMMARY OF THE INVENTION

Based on this problem the upright wheelchair described at the outset will be improved to the extent where anatomical foot support comparison is possible.

In the interests of solving this problem a generic wheelchair is distinguished in that when the seat is in the sitting position the footrest is inclined relative to the horizontal at an angle $\alpha$ and during upright motion the angle $\alpha$ becomes zero.

Due to this configuration during upright motion from the seating position to the standing position the footrest traces the natural movement of a person when standing up. When standing up from a chair an able-bodied person moves his/her feet back into a position safe for standing. By using this structural configuration the natural standing procedure is mechanically modelled.

The angle of inclination $\alpha$ of the footrest is preferably adjustable. The patient takes up a comfortable posture in the seating position.

During upright motion the footrest is then compulsorily set parallel to the ground, creating a steady standing position.

The angle $\alpha$ preferably becomes zero on commencement of upright motion. If the angle to the horizontal is zero the suspension of the footrest in the vertical is aligned. Depending on the initial angle the vertical position ($\alpha=0$) can already be reached following slight upright motion. The footrest is then preferably lowered vertically, resulting in substantially less compressive load on the knee. Yet the lowering can also already begin immediately when the upright motion is initiated.

The footrest is preferably housed telescoping in a guide tube, together with which it forms a foot support unit. This makes it possible to alter the distance of the footrest from the seat area and to adapt it to the anatomy of the patient.

It is particularly advantageous if the foot support unit is articulated on a lever arranged on a pivotable chassis and preferably if this lever in particular is connected to the seat. The upright motion of the seat then results directly in diminishing the angle of the footrest to the horizontal.

A particularly simple construction is when the lever is connected to the seat by means of a connecting link and the connecting link is articulated by its one end to the seat and by its other end to the lever.

The lever can be spring-loaded, thus reducing the force required to swivel the foot support unit.

The angle of inclination y of the foot support unit is preferably adjustable relative to the vertical.

If the foot support unit is locked in the standing position, the wheelchair can also be moved in this standing position.

In the seating position a vertical distance between the footrest and the ground is required to enable lowering of the foot support unit on standing upright. It is advantageous in this case if the vertical height of the seat column, which is part of the chassis and is arranged articulated on the foot support unit, can be adjusted. The seat column can be connected detachably to the chassis.

BRIEF DESCRIPTION OF THE DRAWINGS

An embodiment of the invention will now be described in greater detail by means of a diagram, in which.

DESCRIPTION OF THE PREFERRED EMBODIMENT

Figure 1:
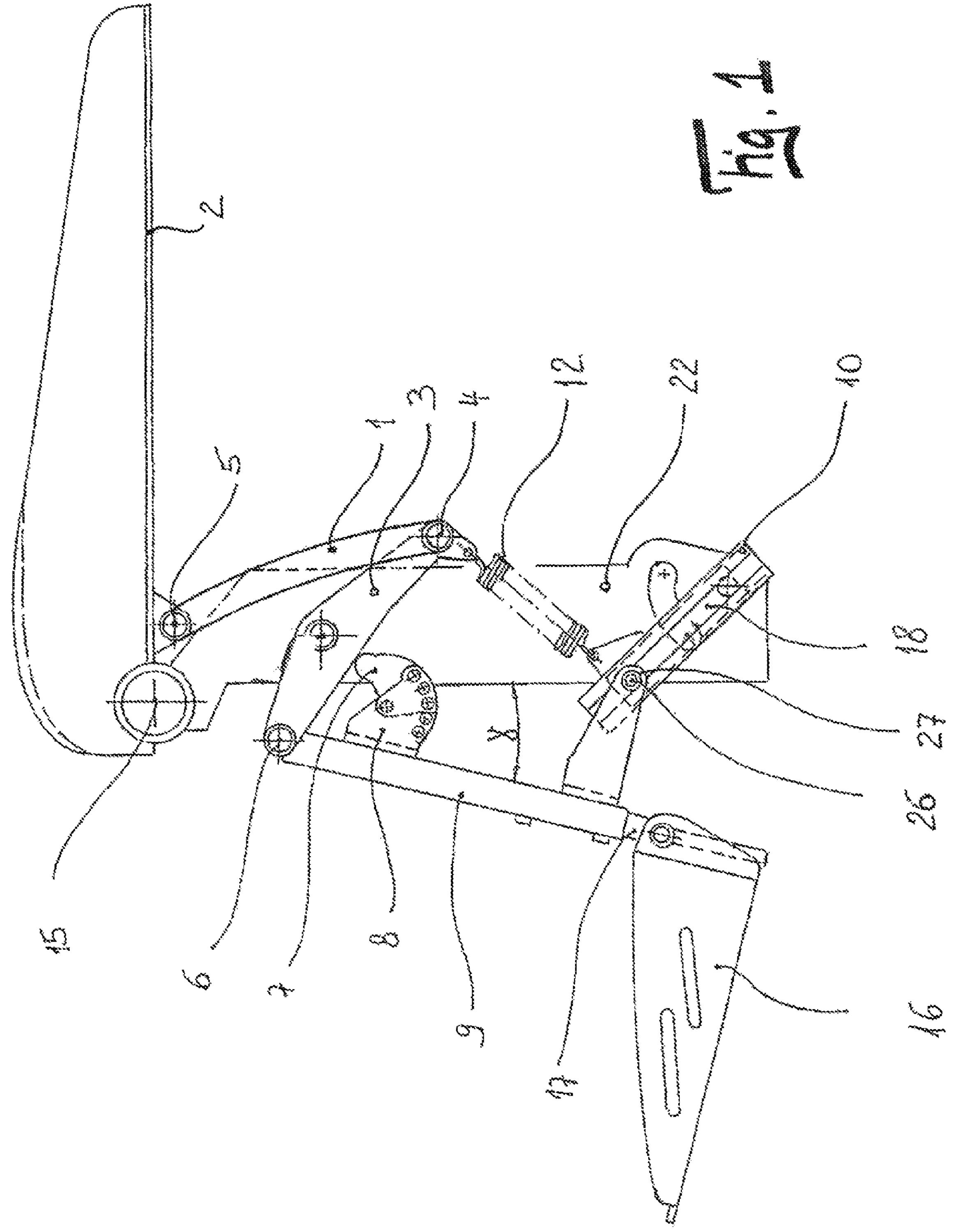
FIG. 1 shows the schematic partial side elevation of an upright wheelchair in the seating position.

The wheelchair comprises the chassis 29 with the upright unit 33 set on it, the drive wheels 30 and both steerable front wheels 31. The upright unit 33 has a seat 2, a seat back 32 and a footrest 16 which is arranged to telescope in the guide tube 9 and forms a foot support unit 169 together with the latter. An actuator 15 is used to pivot the upright unit 33. For this to happen, the seat area of the seat 2 reaches a vertical position. The seat back 32 maintains its vertical position and thus stands parallel to the seating area. At the same time as the seat 2 is tilted the footrest 16 drops. The centre of gravity is in the standing position between the drive wheels 30 and the front wheels 31. The footrest is located at a distance from the ground, making it possible to drive the wheelchair in the standing position.

A seat column 22 is part of the chassis and is connected detachably to the chassis 29. The vertical height of the seat column 22 can be adjusted to enable lowering of the foot support unit during the standing procedure.

The foot support unit 169 is linked via the seat 2. The connecting link 1 with axes of rotation 4 and 5 connects the seat area 2 to the reversing lever 3. Connecting link 1 is articulated to the seat by on end 1' and by its other end 1" to the reversing lever 3. The guide tube 9, in which the footrest 16 is connected to telescope with the foot support tube 17, is connected rotatably to the reversing lever 3 via the axis 6. The stop bearer 8 is connected undetachably to the guide tube 9. The stop 7 is connected detachably to the stop bearer 8. As a result of gravity the intrinsic weight of the foot support unit 169 and the tensile spring 12 presses the stop 7 against the reversing lever 3. Both the stop 7 and the stop bearer 8 attached to the guide tube 9 are provided with a plurality of boreholes 14, by which the position of the stop 7 relative to the stop bearer 8 can be adjusted and can be fixed by means of a screw connection. The foot support angle γ, inclining of the foot support unit 169, can be adjusted relative to the vertical by selectively fastening the stop 7 on the stop bearer 8. Alternatively, the stop bearer 8 can be connected to the stop 7 in a longitudinal direction to the guide tube 9 for adjusting the foot support angle γ. In FIGS. 1 to 4 only the seat column 22 of the chassis 29 is illustrated. The connecting link 1, reversing lever 3 and stop bearer 8 with the stop 7 are arranged to the left and right of the seat column 22. Two foot support units 169 or a single for both legs can be provided.

The foot support tube 17 is connected telescopically to the guide tube 9 to cater for the lower leg length of the patient. The footrest 16 is connected to fold up about the axis of rotation 19 with the foot support tube 17. It is adjustable at an angle γ relative to the seat column 22.

Figure 2:
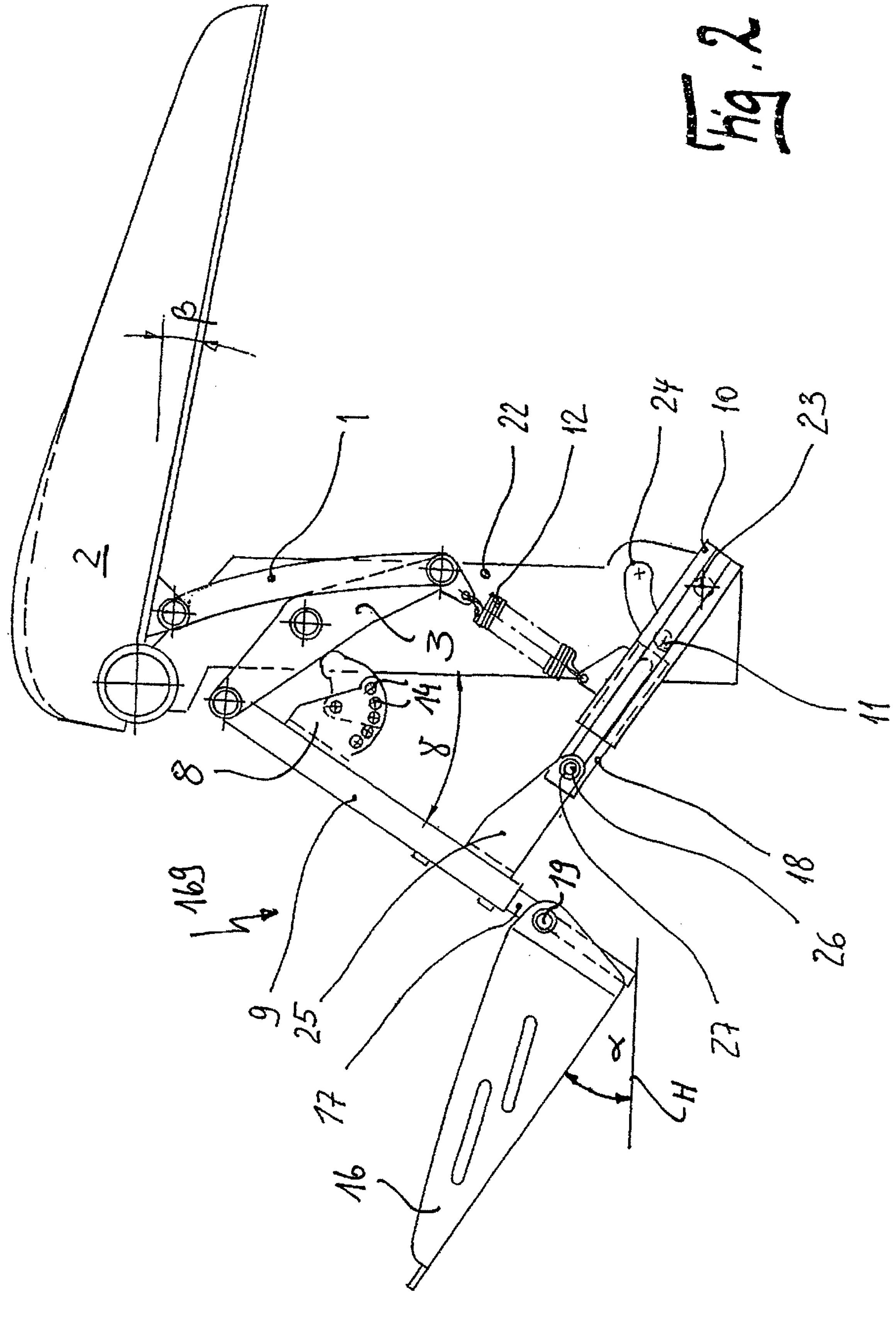
FIG. 2 shows the illustration in FIG. 1 with tilted seat.
Figure 3:
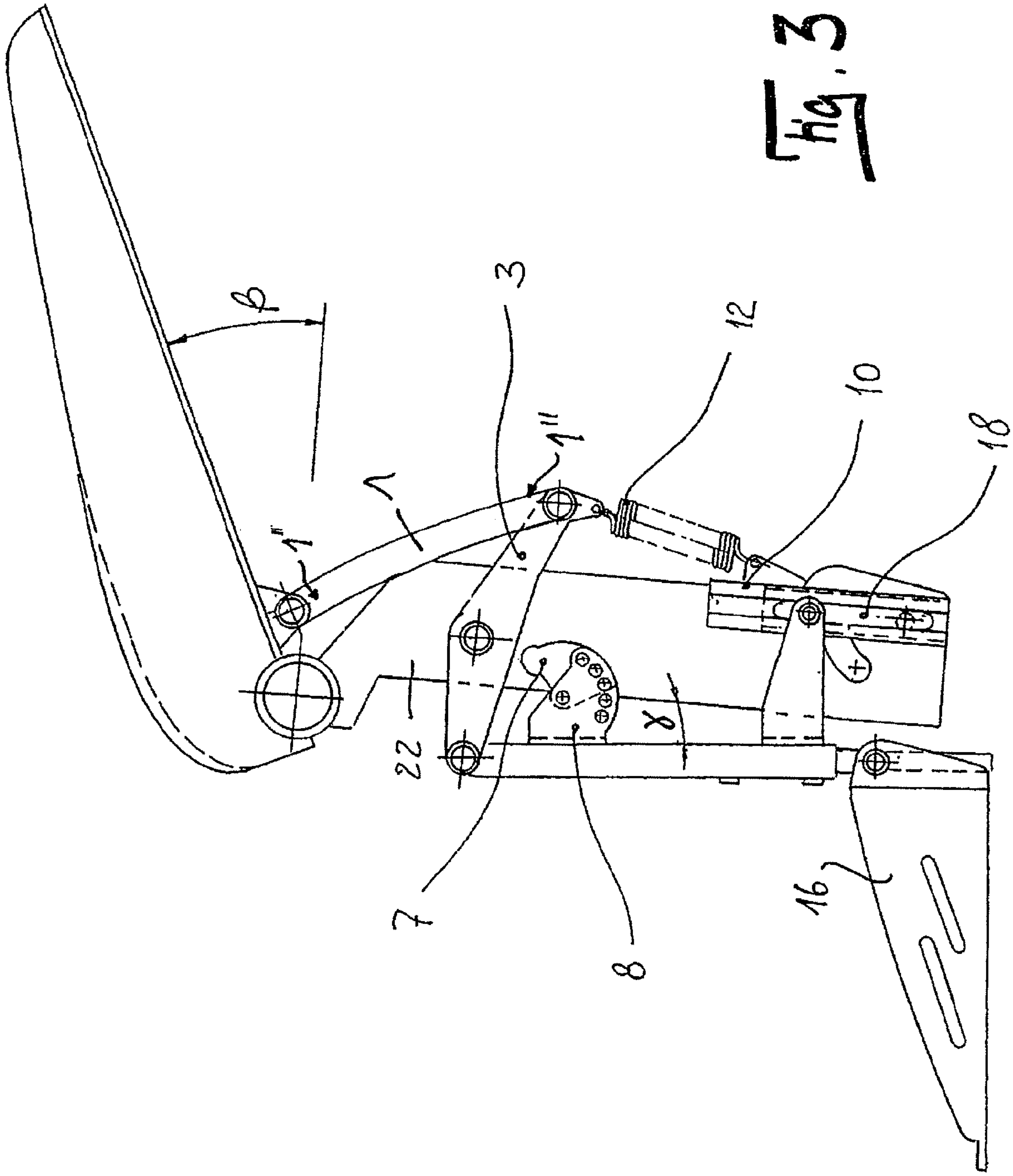
FIG. 3 shows the illustration in FIG. 1 during upright motion of the seat.
Figure 4:
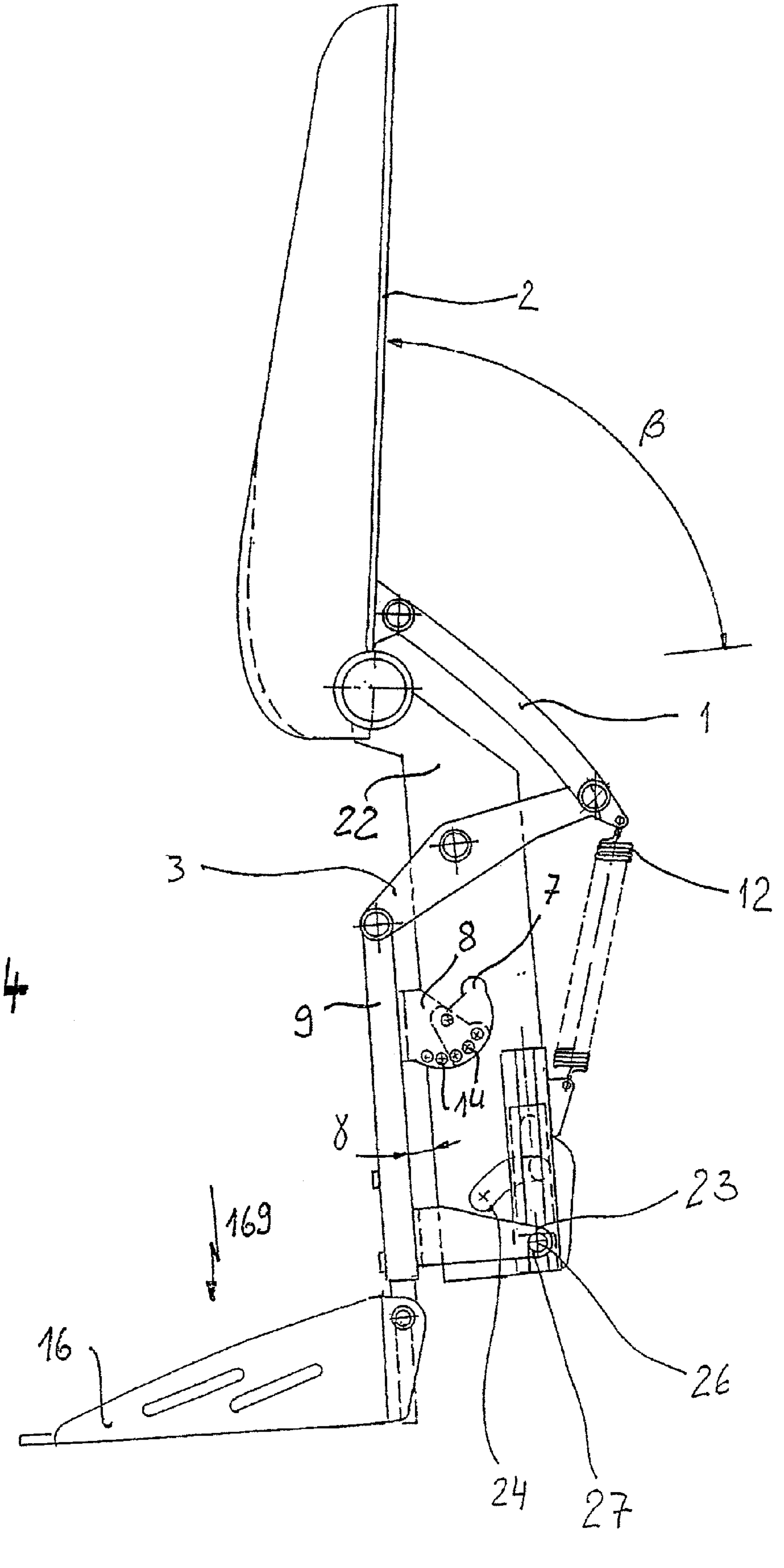
FIG. 4 shows the illustration in FIG. 1 in the standing position.
Figure 5:
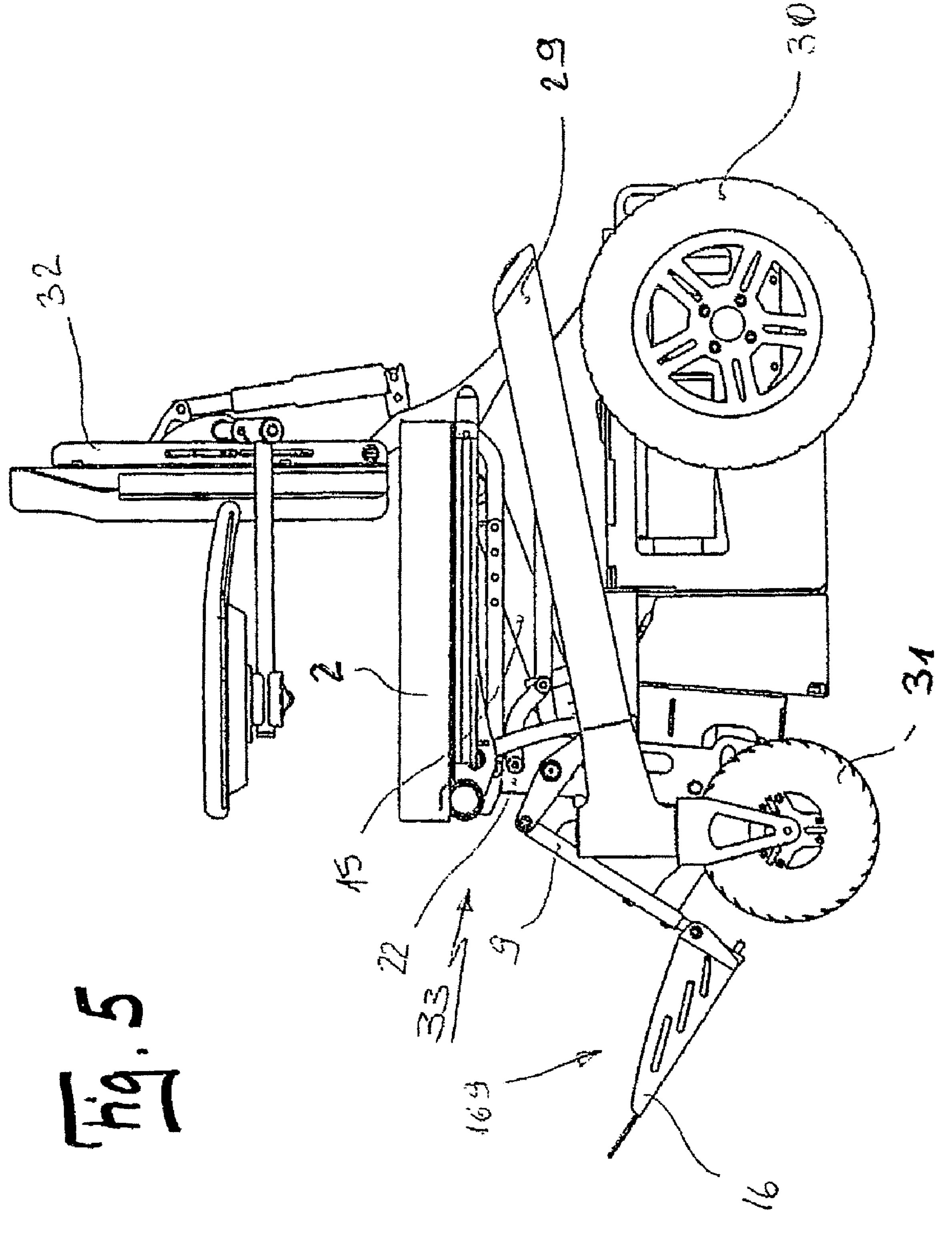
FIG. 5 shows the side elevation of an upright wheelchair.

As FIG. 2 shows the inclining (angle β) of the seat 2 moves into the negative whenever it is tilted. The connecting link 1 moves the reversing lever 3 during tilting and thus the whole foot support unit 169. The foot support angle γ increases. Against gravity and the tensile spring 12 the foot support angle γ can be enlarged manually until it forms a limitation. The guide rail 10 swivel-mounted about the axis 23 with the slide block 18 guided therein acts as limitation for the foot support angle γ. Located on the guide rail 10 is the stop bolt 11 which moves inside the arched segment 24.

The limitation made up of guide rail 10 and slide block 18 can be arranged on both sides, on one side or in the middle of the seat column 22. The connector plate 25 is connected undetachably to the guide tube 9, and the slide bolt 27 with the axis 26 is connected undetachably to the connector plate 25.

When the wheelchair occupant stands the foot support unit 169 moves in the vertical, powered by gravity and the tensile spring 12 in the guide rail 10 guided by the slide block 18. The angle α of the footrest 16 to the horizontal H decreases in the process until it reaches zero. The foot support unit 169 then reaches the vertical and the stop 7 loses contact with the reversing lever 3. The foot support unit 169 now drops in a vertical direction until it reaches the standing position (FIG. 4), at which point the slide bolt 27 with the axis 26 is under the axis of rotation 23. The foot support unit 169 is fixed in this position. Forward motion is prevented by the stop bolt 11 in the arched segment 24 and rearward motion is prevented by the torque generated by the tensile spring 12.

LEGEND

1 connecting links
2 seat
3 reversing lever
4 axis of rotation
5 axis of rotation
6 axis
7 stop
8 stop bearer
9 guide tube
10 guide rail
11 stop bolt
12 tensile spring
14 bore
15 actuator
16 footrest
17 foot support tube
18 slide block
19 axis of rotation
22 seat column
23 axis of rotation
24 arched segment
25 connector plate
26 axis
27 slide bolt
29 chassis
30 rear wheel
31 front wheel
32 seat back
33 upright unit
169 foot support unit
α angle (inclining of footrest 16 to horizontal H)
β seating angle
γ foot support angle
H horizontal

The invention claimed is:

1. An upright wheelchair, comprising:

a chassis;

a seat on the chassis which is pivotable from a substantially horizontal seating position to a substantially vertical standing position; and at least one footrest arranged on the chassis and being movable to different positions when said seat is moved to said substantially horizontal seating position and when said seat is moved to said substantially vertical position, wherein when the seat is in the substantially horizontal seating position the at least one footrest is inclined at an angle (α) relative to horizontal (H), and wherein when the seat is pivoted to the substantially vertical standing position, the angle (α) of the at least one footrest relative to horizontal (H) becomes zero, and wherein said at least one footrest is configured to move toward ground where the angle (α) of the at least one footrest relative to horizontal (H) becomes zero prior to said seat moving from said substantially horizontal seating position to said substantially vertical position.

2. The upright wheelchair as claimed in claim 1, wherein the at least one footrest has a telescoping connection in a guide tube.

3. The upright wheelchair as claimed in claim 1, further comprising a reversing lever arranged pivotably on the chassis connected to one or more of said seat and said at least one footrest, said reversing lever being engaged when either said seat or said at least one footrest are to be moved to accommodate said substantially horizontal seating position and said substantially vertical standing position.

4. The upright wheelchair as claimed in claim 3, wherein the reversing lever is connected to the seat.

5. The upright wheelchair as claimed in claim 4, wherein the reversing lever is connected to the seat by a connecting link which has one end connected to the seat and another end connected to the reversing lever.

6. The upright wheelchair as claimed in claim 3 wherein the reversing lever is spring-loaded.

7. The upright wheelchair as claimed in claim 1, further comprising a means for adjustably inclining the at least one footrest relative to vertical.

8. The upright wheelchair as claimed in claim 1, wherein said at least one footrest is configured for vertical lowering and vertical lowering of said at least one footrest occurs when said either seat or said at least one footrest are to be moved to accommodate said substantially horizontal seating position and said substantially vertical standing position.

9. The upright wheelchair as claimed in claim 1, further comprising a means for adjusting the angle of inclination ($\alpha$) of the footrest relative to horizontal (H) when said seat is in said substantially horizontal seating position.

10. An upright wheelchair, comprising:

a chassis;

a seat on the chassis which is pivotable from a substantially horizontal seating position to a substantially vertical standing position;

at least one footrest arranged on the chassis and being movable to different positions when said seat is moved to said substantially horizontal seating position and when said seat is moved to said substantially vertical position;

wherein when the seat is in the substantially horizontal seating position the at least one footrest is inclined at an angle ($\alpha$) relative to horizontal (H), and wherein when the seat is pivoted to the substantially vertical standing position, the angle ($\alpha$) of the at least one footrest relative to horizontal (H) becomes zero, and wherein said at least one footrest is configured for vertical lowering and vertical lowering of the at least one footrest is permitted only when $\alpha=0$.

11. The upright wheelchair as claimed in claim 10 wherein vertical lowering of said at least one footrest is accomplished using a telescoping connection of said at least one footrest in a guide tube.

12. The upright wheelchair as claimed in claim 10 further comprising a reversing lever arranged pivotably on the chassis connected to one or more of said seat and said at least one footrest, said reversing lever being engaged when either said seat or said at least one footrest are to be moved to accommodate said substantially horizontal seating position and said substantially vertical standing position.

13. The upright wheelchair as claimed in claim 12, wherein the reversing lever is connected to the seat.

14. The upright wheelchair as claimed in claim 12 wherein the reversing lever is spring-loaded.

15. The upright wheelchair as claimed in claim 10, further comprising a means for adjustably inclining the at least one footrest relative to vertical.

16. The upright wheelchair as claimed in claim 10, further comprising a means for adjusting the angle of inclination ($\alpha$) of the footrest relative to horizontal (H) when said seat is in said substantially horizontal seating position.

* * * * *